US009503525B2

(12) United States Patent
Tulino et al.

(10) Patent No.: US 9,503,525 B2
(45) Date of Patent: Nov. 22, 2016

(54) DEVICES AND METHODS FOR NETWORK-CODED AND CACHING-AIDED CONTENT DISTRIBUTION

(71) Applicants: Antonia Tulino, Red Bank, NJ (US);
Jaime Llorca, Red Bank, NJ (US);
Karthikeyan Shanmugam, Austin, TX (US)

(72) Inventors: Antonia Tulino, Red Bank, NJ (US);
Jaime Llorca, Red Bank, NJ (US);
Karthikeyan Shanmugam, Austin, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 225 days.

(21) Appl. No.: 14/514,905

(22) Filed: Oct. 15, 2014

(65) Prior Publication Data
US 2015/0207903 A1    Jul. 23, 2015

Related U.S. Application Data (60) Provisional application No. 61/930,072, filed on Jan. 22, 2014.

(51) Int. Cl.
*H04L 29/08*        (2006.01)
*G06F 17/30*        (2006.01)
(Continued)

(52) U.S. Cl.
CPC ..... *H04L 67/1097* (2013.01); *G06F 17/30902* (2013.01); *H04L 43/045* (2013.01); *H04L 43/062* (2013.01); *H04L 45/14* (2013.01); *H04L 67/06* (2013.01); *H04L 67/2833* (2013.01);
(Continued)

(58) Field of Classification Search
CPC ............. H04L 27/2697; H04L 45/123; H04L 45/124; H04L 45/125; H04L 43/045; H04L 43/062; H04L 45/14; H04L 67/2833; H04L 67/2842; H04L 67/32; H04L 67/327; H04W 84/18; H04W 72/0446; H04W 74/04; H04W 24/00; H04W 40/16

See application file for complete search history.

(56) References Cited

U.S. PATENT DOCUMENTS 5,832,475 A *  11/1998  Agrawal ........... G06F 17/30489
2008/0079724 A1*  4/2008  Isard ..................... G06T 11/206
                                                    345/440

(Continued)

OTHER PUBLICATIONS

M. Asad, R. Chaudhry, and A. Sprintson. "Efficient algorithms for index coding." *Computer Communications Workshops*, 2008. Apr. 2008. XP 31273967.

Z. Gao et al. "Network coding based schemes for imperfect wireless packet retransmission problems: A divide and conquer approach." *Wireless Personal Communications*, Kluwer Academic Publishers, DO. vol. 62(4). Aug. 2010. XP 35004245.

(Continued)

*Primary Examiner* — Dang Ton
*Assistant Examiner* — Sai Aung
(74) *Attorney, Agent, or Firm* — Harness, Dickey & Pierce, P.L.C.

(57) ABSTRACT

A method for transmitting data files in a network includes receiving requests from destination devices for packets of the data files. The method includes constructing a conflict graph such that each packet requested by each destination device is represented by a distinct vertex in a plurality of vertices of the conflict graph, the plurality of vertices being associated with the destination devices. The method includes assigning labels to the plurality of vertices. The method includes assigning levels to the plurality of vertices. The method includes ordering the plurality of vertices from vertices having a highest level to vertices having a lowest level. The method includes coloring the plurality of vertices based on the ordering. The method includes combining the packets represented by vertices in the plurality of vertices having a same color. The method includes sending the combined packets.

18 Claims, 8 Drawing Sheets

(51) Int. Cl.
  *H04L 12/26* (2006.01)
  *H04L 12/721* (2013.01)
(52) U.S. Cl.
  CPC ....... *H04L 67/2842* (2013.01); *H04L 67/2847* (2013.01); *H04L 67/32* (2013.01); *H04L 67/327* (2013.01); *H04L 67/36* (2013.01)

(56) References Cited

U.S. PATENT DOCUMENTS

2008/0082644 A1* 4/2008 Isard ............... H04L 67/1097 709/223
2010/0205588 A1* 8/2010 Yu ............................ G06F 9/52 717/149

OTHER PUBLICATIONS

J Llorca, A.M. Tulino, K Guan, J Esteban, M Varvello, N. Choi, and D Kilper, "Network-coded caching-aided multicast for efficient content delivery," *ICC, 2013 Proceedings IEEE*. IEEE, 2013. XP 32522408.

International Search Report (PCT/ISA/210) mailed Apr. 8, 2015 for corresponding International Application No. PCT/US2015/011000.

Written Opinion of the International Searching Authority (PCT/ISA/237) mailed Apr. 8, 2015 for corresponding International Application No. PCT/US2015/011000.

J. Mingyue et al. "On the average performance of caching and coded multicasting with random demands," *2014 11th International Symposium on Wireless Communications Systems*, IEEE. Aug. 2014. XP 32666570.

* cited by examiner

$A_2, B_2, C_2$ = Black
$B_3, C_3$ = Red
$A_4, B_4$ = Blue
$A_3$ = Brown
$C_4$ = Purple

DEVICES AND METHODS FOR NETWORK-CODED AND CACHING-AIDED CONTENT DISTRIBUTION

CROSS-REFERENCE TO RELATED APPLICATIONS

This application claims priority under 35 U.S.C. §119(e) to provisional U.S. application No. 61/930,072 filed on Jan. 22, 2014, the entire contents of which are incorporated herein by reference.

BACKGROUND

Currently, content distribution networks (CDNs) face capacity and efficiency issues associated with the increase in popularity of on-demand audio/video streaming. One way to address these issues is through network caching and network coding. For example, conventional content distribution network (CDN) solutions employ centralized algorithms for the placement of content copies among caching locations within the network. Conventional solutions also include cache replacement policies such as LRU (least recently used) or LFU (least frequently used) to locally manage distributed caches in order to improve cache hit ratios. Other conventional solutions use random linear network coding to transfer packets in groups, which may improve throughput in capacity-limited networks.

However, conventional network caching and network coding solutions do not consider the relative efficiency of caching and transmission resources. This leads to suboptimal cost per delivered object or file. Moreover, conventional content delivery solutions do not exploit the possible combined benefits of network caching and network coding.

SUMMARY

At least one example embodiment is directed to methods and/or devices for content distribution including a caching phase and a delivery phase.

According to at least one example embodiment, a method for transmitting data files in a network includes receiving requests from destination devices for packets of the data files. The method includes constructing a conflict graph such that each packet requested by each destination device is represented by a distinct vertex in a plurality of vertices of the conflict graph, the plurality of vertices being associated with the destination devices. The method includes assigning labels to the plurality of vertices, each label being a set of indices denoting the destination devices requesting a packet and the destination device caches storing the packet. The method includes assigning levels to the plurality of vertices, each level indicating a number of the destination devices requesting the packet and a number of destination device caches storing the packet. The method includes ordering the plurality of vertices from vertices having a highest level to vertices having a lowest level. The method includes coloring the plurality of vertices based on the ordering. The method includes combining the packets represented by vertices in the plurality of vertices having a same color. The method includes sending the combined packets.

According to at least one example embodiment, each level is a sum of the number of destination devices requesting a packet and the number of destination device caches storing the requested packet.

According to at least one example embodiment, the combining performs linear combination operations over a finite field on the packets represented by the vertices having the same color.

According to at least one example embodiment, the constructing includes creating a link between a first and a second of the plurality of vertices if (i) the first and second vertices do not represent a same packet, and (ii) a packet represented by the first vertex is not stored in the cache of the destination device associated with the second vertex, or the packet represented by the second vertex is not stored in the cache of the destination device associated with the first vertex.

According to at least one example embodiment, the coloring includes selecting an uncolored vertex having the highest level, and assigning a same color to the selected vertex and to a subset of uncolored vertices in the plurality of vertices if (i) the vertices in the subset have a desired label, the desired label being based on input parameters and on the label of the selected vertex, (ii) the vertices in the subset do not have a link to the selected vertex, (iii) the vertices in the subset do not have link between each other, and (iv) a cardinality of the subset is equal to the value of the level minus one.

According to at least one example embodiment, the coloring includes performing the selecting and the assigning a same color operations iteratively until all vertices of the highest level have been selected.

According to at least one example embodiment, the coloring includes performing additional coloring operation on vertices in the highest level that are uncolored if a number of the uncolored vertices is greater than or equal the highest level. The coloring includes updating levels of vertices of the highest level that are still uncolored after the additional coloring operation to a next level below the highest level.

According to at least one example embodiment, the coloring is performed until the plurality of vertices of the conflict graph are colored.

According to at least one example embodiment, the method includes performing a local search on the plurality of colored vertices to reduce the number of colors used for the conflict graph.

According to at least one example embodiment, the performing a local search includes selecting a color from existing colors of the conflict graph, identifying vertices with the selected color, and replacing the selected color with a different color chosen from the existing colors if vertices linked to the identified vertices are not colored with the different color.

It should be understood that the above methods may be performed by a network element (e.g., a content source) within a communications network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processors (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a special purpose processor or special purpose processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 1:
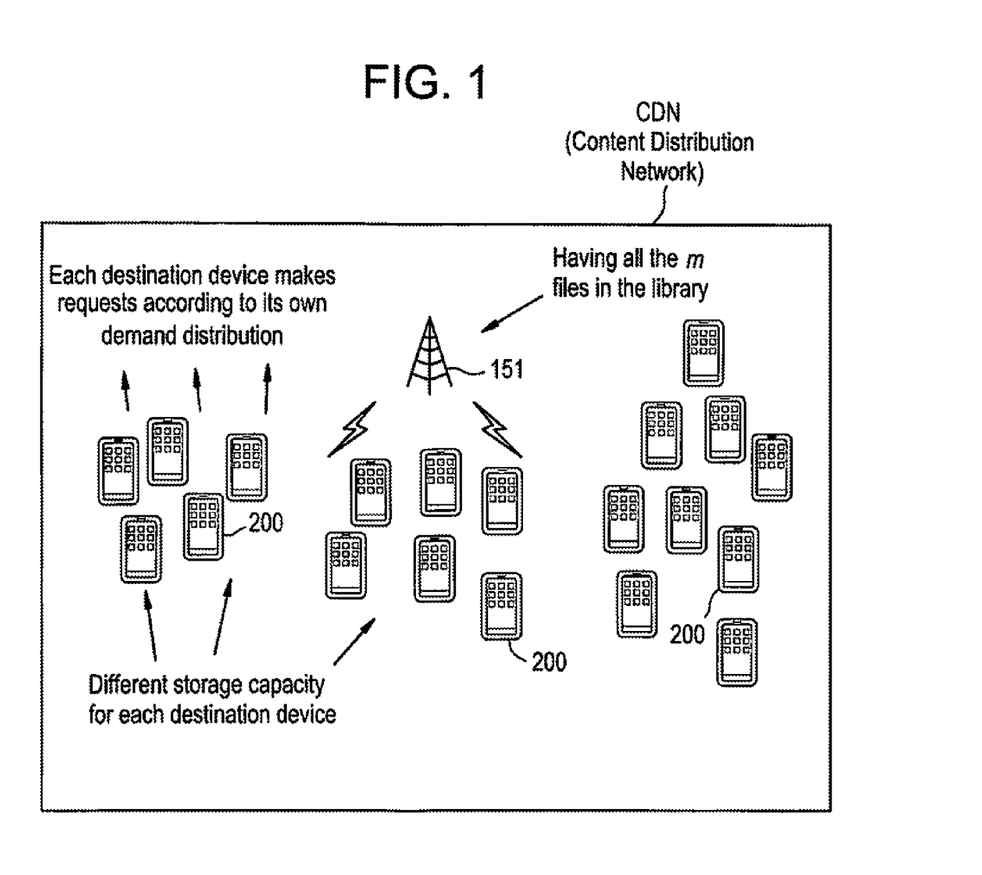
FIG. 1 shows a content distribution network according to at least one example embodiment.

FIG. 1 shows a content distribution network according to at least one example embodiment.

As shown in FIG. 1, a content distribution network (CDN) may include the network element 151 connected to a plurality of destination devices (or user devices) 200. The network element 151 may be a content source (e.g., a multicast source) for distributing data files (e.g., movie files). The destination devices 200 may be end user devices requesting data from the content source. For example, each destination device 200 may be part of or associated with a device that allows for the user to access the requested data. For example, each destination device 200 may be a set top box, a personal computer, a tablet, a mobile phone, or any other device associated used for streaming audio and video. Each of the destination devices 200 may include a memory for storing data received from the network element 151. The structure and operation of the network element 151 and destination devices 200 will be described in more detail below with reference to FIGS. 2 and 3.

Figure 2:
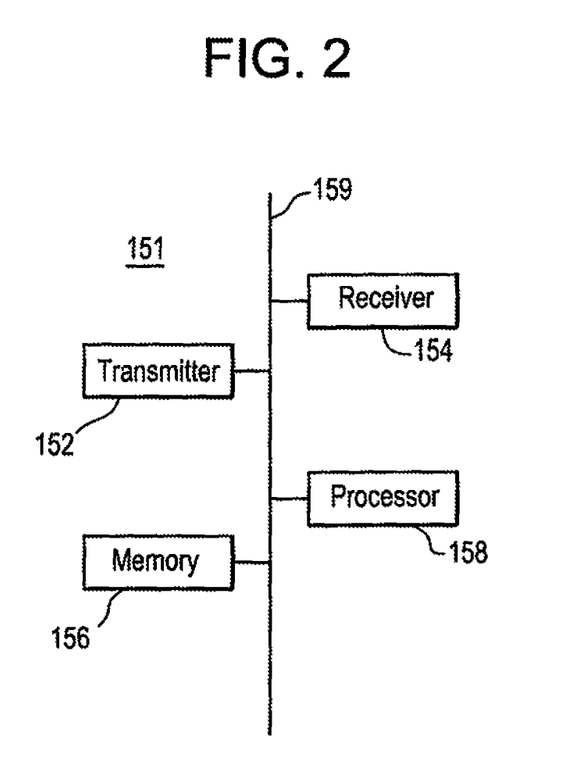
FIG. 2 is a diagram illustrating an example structure of network element according to an example embodiment.

FIG. 2 is a diagram illustrating an example structure of network element according to an example embodiment. According to at least one example embodiment, the network element 151 may be configured for use in a communications network (e.g., the content distribution network (CDN) of FIG. 1). Referring to FIG. 2, the network element 151 may include, for example, a data bus 159, a transmitter 152, a receiver 154, a memory 156, and a processor 158. Although a separate description is not included here for the sake of brevity, it should be understood that each destination device 200 may have the same or similar structure as the network element 151.

The transmitter 152, receiver 154, memory 156, and processor 158 may send data to and/or receive data from one another using the data bus 159. The transmitter 152 is a device that includes hardware and any necessary software for transmitting wireless signals including, for example, data signals, control signals, and signal strength/quality information via one or more wireless connections to other network elements in a communications network.

The receiver 154 is a device that includes hardware and any necessary software for receiving wireless signals including, for example, data signals, control signals, and signal strength/quality information via one or more wireless connections to other network elements in a communications network.

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code. For example, it should be understood that the modifications and methods described below may be stored on the memory 156 and implemented by the processor 158 within network element 151.

Further, it should be understood that the below modifications and methods may be carried out by one or more of the above described elements of the network element 151. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

It should be understood that example embodiments are directed to a caching phase (described below with reference to FIGS. 3A and 3B) and a delivery phase (described below with reference to FIGS. 4-7).

FIGS. 3-6B are flow charts illustrating example operations of the network element in FIG. 2. For example, FIGS. 3A-3B show example operations for carrying out a method of caching in a communications network. FIGS. 4-6B show example operations for delivering data files after the caching method has been performed.

Figure 3A:
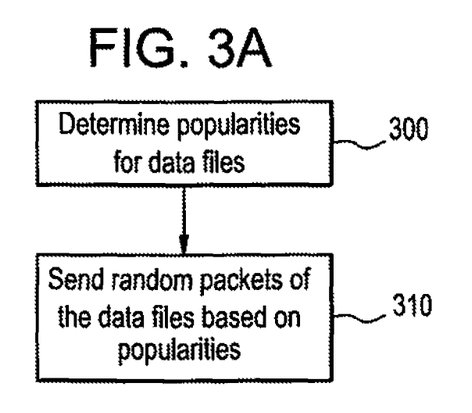
FIGS. 3A-3B are flow charts illustrating example operations of the network element in FIG. 2.
Figure 3B:
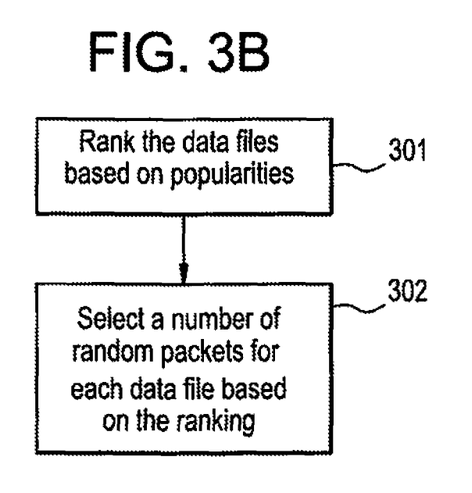

It should be understood that FIGS. 3A-3B are for carrying out a caching distribution method related to Algorithm 1 below, where each data file 'f' is divided into 'B' equal-size packets represented as symbols of a finite field and belongs to library 'F':

---

Algorithm 1: Caching algorithm

---

1 for f ∈ F →
2  Each user u caches a subset of
   $p_{f,u}M_uB$ distinct packets of file f
   uniformly at random;
3 endfor
4  M = {$M_{u,f}$, with u = 1,..., n, and f = 1,..., m} ;
5 return( M );
end Caching algorithm

---

In Algorithm 1, '$p_u=[p_{u,1}, \ldots p_{u,m}]$' is the caching distribution of the 'u' destination device 200, where $\Sigma_{f=1}^{m} p_{f,u}=1, \forall u$ with u=1, ..., n, and $0 \leq p_{f,u} \leq 1/M_u$, $\forall f=1, \ldots, m$, u=1, ..., n, 'm' is the number of files hosted by the network element 151, and '$M_u$' is the storage capacity of the cache at destination device 'u' (i.e., destination device 200) and $M_{u,f}=p_{f,u}M_uB$ denotes the packets of file f cached at user u. The network element 151 carries out Algorithm 1 such that destination, 'u', device 200 caches $M_{u,f}=p_{f,u}M_uB$ packets of file 'f'. Furthermore, the randomized nature of Algorithm 1 allows network element 151 to perform operations such that, if two destinations caches the same number of packets for a given file 'f', then each of the two destination device 200 caches different packets of the same file 'f'. Algorithm 1 may be implemented by network element 151 according to the operations described in FIGS. 3A-3B below.

Referring to FIG. 3A, in operation 300, the network element 151 may determine popularities for a plurality of data files. The data files may be, for example, video and/or audio files. The network element 151 may determine the popularities based on requests for the plurality of data files from at least one of destination devices 200 (e.g., user requests). The user requests may form a demand distribution for the data files. The network element 151 may determine the popularities according to a demand distribution of all the destination devices 200. In this case, the demand distribution may follow a Zipf distribution. Alternatively, the network element 151 may determine the popularities on a per destination device basis where each destination device 200 has as associated demand distribution.

The network element 151 may determine the popularities based on a number of requests for the data files from the destination devices 200. For example, the network element 151 determines a data file that is requested 100 times by the destination devices 200 as having a higher popularity than a data file that is requested 50 times. Thus, the popularities may be based on which data files are most often requested and viewed by users of the destination devices 200.

The network element 151 may divide each data file into a plurality of packets. For example, the network element 151 may divide each data file in to a same number of packets (e.g., three packets). Accordingly, in operation 310, the network element 151 may send random packets of the plurality of data files to at least one destination device based on the popularities determined in operation 300. For example, the network element 151 may send random packets of each data file to destination devices 200 such that the random packets are stored (or cached) at each destination device 200.

The network element 151 may send the random packets such that each destination device 200 receives a given number of random packets for at least one of the data files based on the determined popularities and input parameters (e.g., number of destination devices, popularity distribution, cache size of each destination device, size of the data file library at network element 151, etc.). For example, the network element 151 may send a same number of packets to each destination device 200 if the destination devices 200 have a same size cache and a same demand distribution (e.g., the destination devices are homogeneous). In one example, assume that there are two destination devices 1 and 2 and two files A and B, divided into ten packets. If (i) destination devices 1 and 2 request file A and file B with the same frequency and file A is requested by both destinations with more frequency than file B, and (ii) the two destination devices 1 and 2 have the same cache size, for example six units in terms of packets, then the network element 151 will perform the caching method such that both destination devices 1 and 2 cache four packets of file A and two packets of file B.

If the network element 151 determined the popularities on a per destination device basis in operation 300, then the network element 151 may send the random packets on a per destination device basis in operation 310. For example, the network element 151 may send a different number of packets to each destination if the destinations devices 200 have different size caches or different demand distributions. In this case, referring to the example above, destination device 1 could receive seven packets of file A and three packets of file B while destination device 2 could receive two packets of file A and five packets of file B. This could be due the fact that destination device 1 requests file A much more than file B and has total cache size of ten units in terms of packets, while destination 2 device requests file A much less than file B and has a total cache size of seven units in terms of packets.

FIG. 3B illustrates example operations of the network element 151 that may be carried out between operations 300 and 310, if desired. For example, following operation 300 in FIG. 3A, the network element 151 may rank the data files based on the determined popularities. For example, in operation 301, the network element 151 may rank the data files from a most popular data file to a least popular data file using the popularities determined in operation 300.

In operation 302, the network element 151 may select, for each data file, a number of random packets based on the ranking. For example, the network element 151 selects a different number of random packets far each destination device and for each of the data files according at least one of a respective rank of each data file and input parameters of the network (e.g., number of destination devices, popularity distribution, cache size of each destination device, size of the data file library at network element 151, etc.). After operation 302, the network element 151 may proceed back to operation 310 in FIG. 3A to send the selected number of random packets for each data file.

It should be appreciated that operation 302 may include the network element 151 dividing the ranked data files into at least a first subset and a second subset based on at least one threshold value. The at least one threshold value may be based on empirical evidence and/or user defined. The first subset may contain higher ranked data files than the second subset. Thus, in operation 310, the network element 151 may send the selected number of random packets for only the data files in the first subset. This may allow for a more efficient caching of the packets at the destination devices 200.

It should be understood that the operations described with reference to FIGS. 3A and 3B allow for improved performance of the network because of the scheme's ability to cache more packets of the more popular files and to increase (or alternatively, maximize) the amount of distinct packets of each file collectively cached by the destination devices 200 and to reduce the number of transmission compared to conventional multicasting.

In conjunction with the above described caching methods, this application discloses example methods for a delivery phase in which requested packets of data files are delivered to destination devices 200. Example methods for the delivery phase are based on graph theory.

Figure 4:
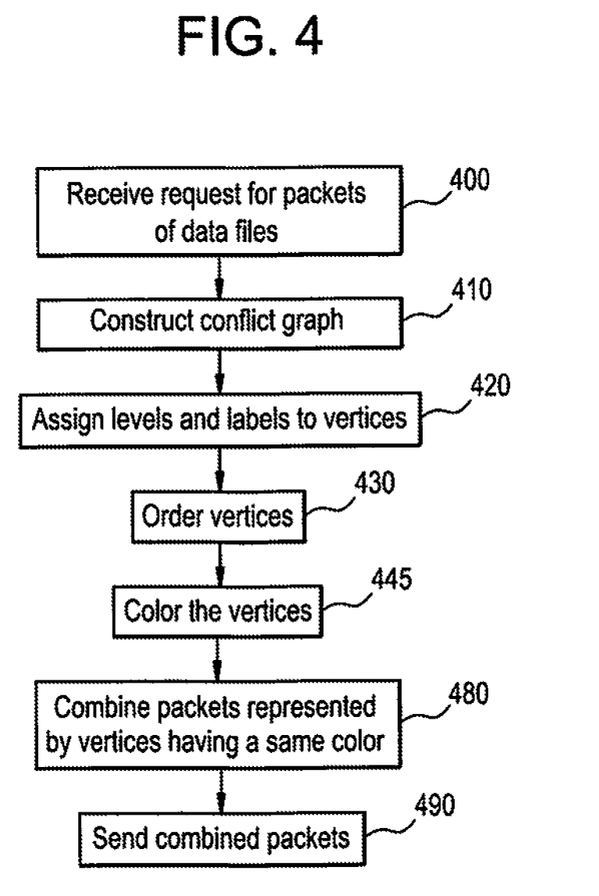
FIG. 4 illustrates example operations for a delivery phase according to at least one example embodiment.

FIG. 4 illustrates example operations for a delivery phase according to at least one example embodiment. With reference to FIG. 4, in operation 400, the network element 151 receives requests from destination devices 200 (or user devices) for packets of the data files. Since the network element 151 has already performed the caching method described above, each destination device 200 requests only those packets that were not cached (or stored) as a result of the caching method. Thus, the delivery phase consists of providing to each destination device 200 the missing part(s) of the requested files, i.e., the packets missing from that destination device's 200 memory.

In operation 410, the network element 151 constructs the conflict graph. For example, the network element 151 populates a conflict graph with a plurality of vertices such that each packet requested by each destination device 200 is represented by a distinct vertex in a plurality of vertices of the conflict graph. Thus, even if a same packet is requested by K different users, the packet is represented as K different vertices in the conflict graph. In other words, each vertex in the conflict graph is associated with a unique pair of a destination device 200 and a requested packet. Thus, it may be said that each vertex of the conflict graph is associated with a destination device 200 and represents a packet requested by the destination device 200. Further, the network element 151 may construct the conflict graph based on which of the plurality of vertices represent a same requested packet and which requested packets are stored in caches belonging to the destination devices 200. Operation 410 is described in further detail below with reference to FIGS. 5, 6A, and 6B.

Still referring to FIG. 4, in operation 420, the network element 151 may assign the plurality of vertices to original levels. Each original level may indicate a number of requests for packets and a number of user destination 200 caches storing the packets. For example, each level may be a sum of the number of user destinations requesting a packet and the number of user device caches storing the requested packet. Thus, if a packet is requested by 4 destinations devices 200 and 3 of the destinations devices 200 are storing the packet, then the original level for the vertex associated with that packet is 3+4=7.

Still referring to FIG. 4, in operation 420, the network element 151 may also assign labels to the plurality of vertices. Each label may indicate the destination devices 200 requesting the packet corresponding to the vertex and the destination device 200 caches storing the packet. For example, each label may be a set of indices corresponding to destination devices 200 requesting the packet and to destination devices 200 storing the requested packet. For example, if a packet is requested by 4 destination devices 200 (e.g., user 1, user 3, user 5, user 10) and 3 of the destinations devices 200 are storing the requested packet (e.g., user 2, user 4, user 8), then the set of indices for the vertex associated with the requested packet is $K_{v_1}=\{1, 3, 5, 10; 2, 4, 8\}$. Here, a length of the label is 7 (i.e., a sum of the number of destination devices requesting a packet and a number of destination device caches storing the packet).

In operation 430, the network element 151 may order the vertices based on the assigned levels. For example, the network element 151 may order the vertices from a highest level to a lowest level in preparation for a coloring operation.

In operation 445, the network element 151 colors the plurality of vertices as a way of labeling the requested packets on the conflict graph. For example, the network element 151 colors the plurality of vertices based on the order determined in operation 430. Operation 445 is discussed in further detail below with respect to FIGS. 6A and 6B.

In operation 480, the network element 151 combines the requested packets represented by vertices having a same color. For example, the network element 151 performs exclusive-OR (XOR) operations (or other linear combination operations over a finite field) on the packets represented by the vertices having the same color.

In operation 490, the network element 151 sends the combined packets. For example, the network element 151 sends the combined packets to the destination devices 200 via a multicast transmission. By combining packets prior to transmission it should be understood that delivery methods according to at least one example embodiment may reduce the number of transmissions of the network element 151 which may reduce consumption and improve network efficiency. It should be understood that the destination devices 200 may receive and decode the transmitted combined packets using a set of XOR operations (or a set of other linear combination operations). For example, the destination devices 200 may decode the combined packets using its cached packets as a key.

Figure 5:
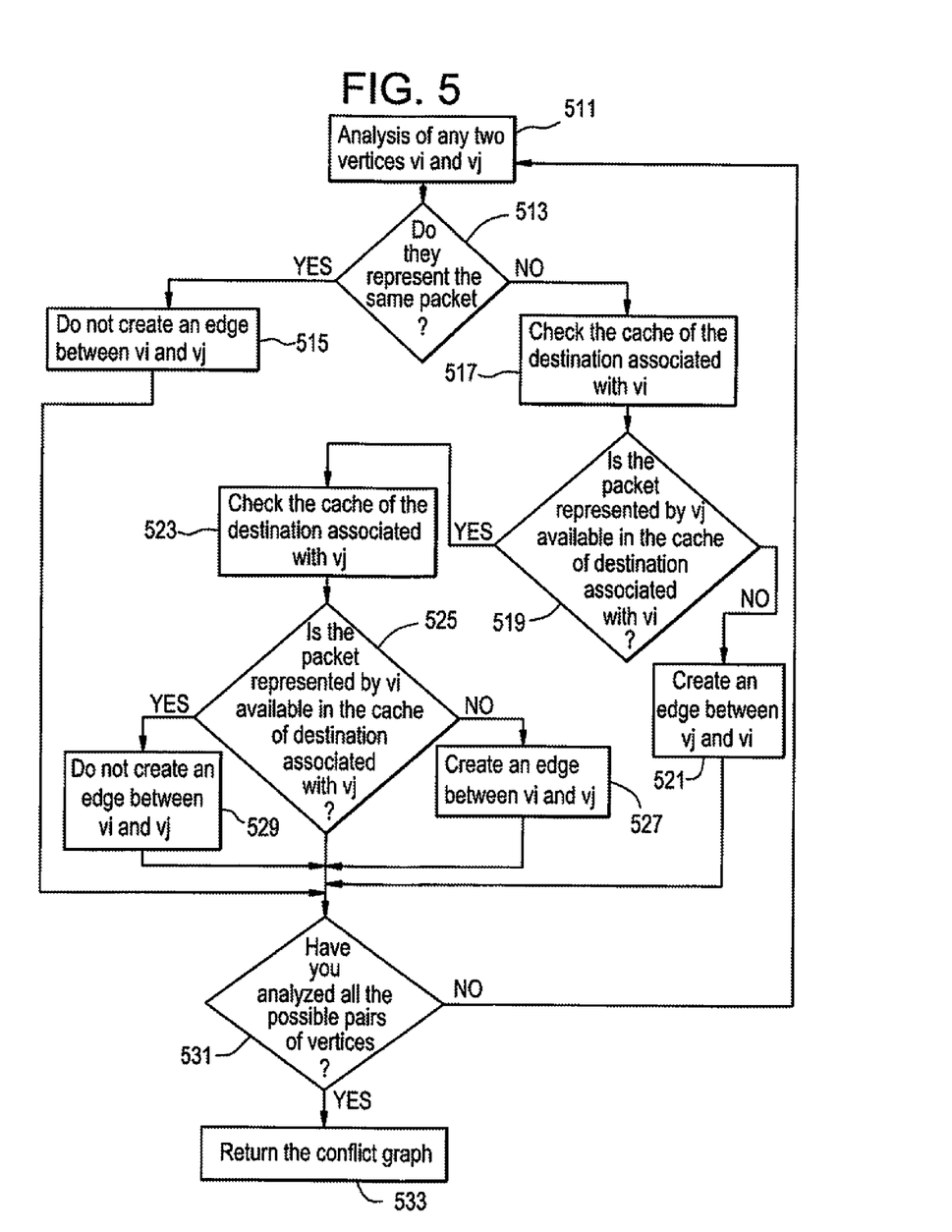
FIG. 5 illustrates example operations for constructing an undirected conflict graph according to at least one example embodiment.

FIG. 5 illustrates example operations for constructing a conflict graph according to at least one example embodiment. For example, FIG. 5 discusses operation 410 from FIG. 4 in further detail. FIG. 5 illustrates example operations for constructing an undirected conflict graph. The undirected conflict graph may be used in conjunction with a coloring scheme referred to in this application hierarchical greedy coloring (HgC) scheme. This coloring scheme is described in more detail below with reference to FIGS. 6A and 6B.

Referring to FIG. 5, in operation 511, the network element 151 analyzes two vertices 'Vi' and 'Vj' from the plurality of vertices populated in operation 410. If, in operation 513, the network element 151 determines that vertices Vi and Vj represent a same requested packet, then the network element 151 does not create a link (or edge) between the two vertices in operation 515. Then, the network element 151 proceeds to operation 531 to determine whether all of the vertices in the conflict graph have been analyzed.

If, in operation 513, the network element 151 determines that the vertices Vi and Vj do not represent a same requested packet, then the network element 151 proceeds to operation 517 and checks the cache (or memory) of the destination device 200 associated with vertex Vi that is requesting the packet represented by vertex Vi. If, in operation 519, the network element 151 determines that the packet representing vertex Vj is not available in the cache of the destination device 200 requesting the packet represented by vertex Vi, then the network element 151 creates a link between vertex Vi and vertex Vj in operation 521. Then, the network element 151 proceeds to operation 531 to determine whether all of the vertices in the conflict graph have been analyzed.

If, in operation 519, the network element 151 determines that the packet representing vertex Vj is available in the cache of the destination device 200 associated with vertex Vi and requesting the packet represented by vertex Vi, then the network element 151 checks the cache of the destination device 200 associated with vertex Vj and requesting the packet represented by vertex Vj in operation 523. If in operation 525, the packet representing vertex Vi is not available in the cache of the destination device 200 associated with vertex Vj and requesting the packet represented by the vertex Vj, then the network element 151 creates a link between vertices Vi and Vj in operation 527 before proceeding to operation 431 to determine whether all of the vertices in the conflict graph have been analyzed.

If, in operation 525, the network element 151 determines that the packet representing vertex Vi is available in the cache of the destination device 200 associated with vertex Vj and requesting the packet represented by the vertex Vj, then the network element 151 does create a link between vertices Vi and Vj in operation 529. Then, the network element 151 proceeds to operation 531 to determine whether all of the vertices in the conflict graph have been analyzed.

Once the network element 151 has analyzed all of the vertices in the conflict graph, then the network element 151 returns the constructed conflict graph in operation 533.

In view of FIG. 5, it should be understood that the constructing operation 410 in FIG. 4 may summarized by an operation of creating a link between a first and a second of the plurality of vertices if (i) the first and second vertices do not represent a same packet, and (ii) the packet represented by the first vertex is not stored in the cache of the user device associated with the second vertex and requesting the packet represented by the second vertex, or the packet represented by the second vertex is not stored in a cache of a user device associated with the first vertex and requesting the packet represented by the first vertex.

Figure 6A:
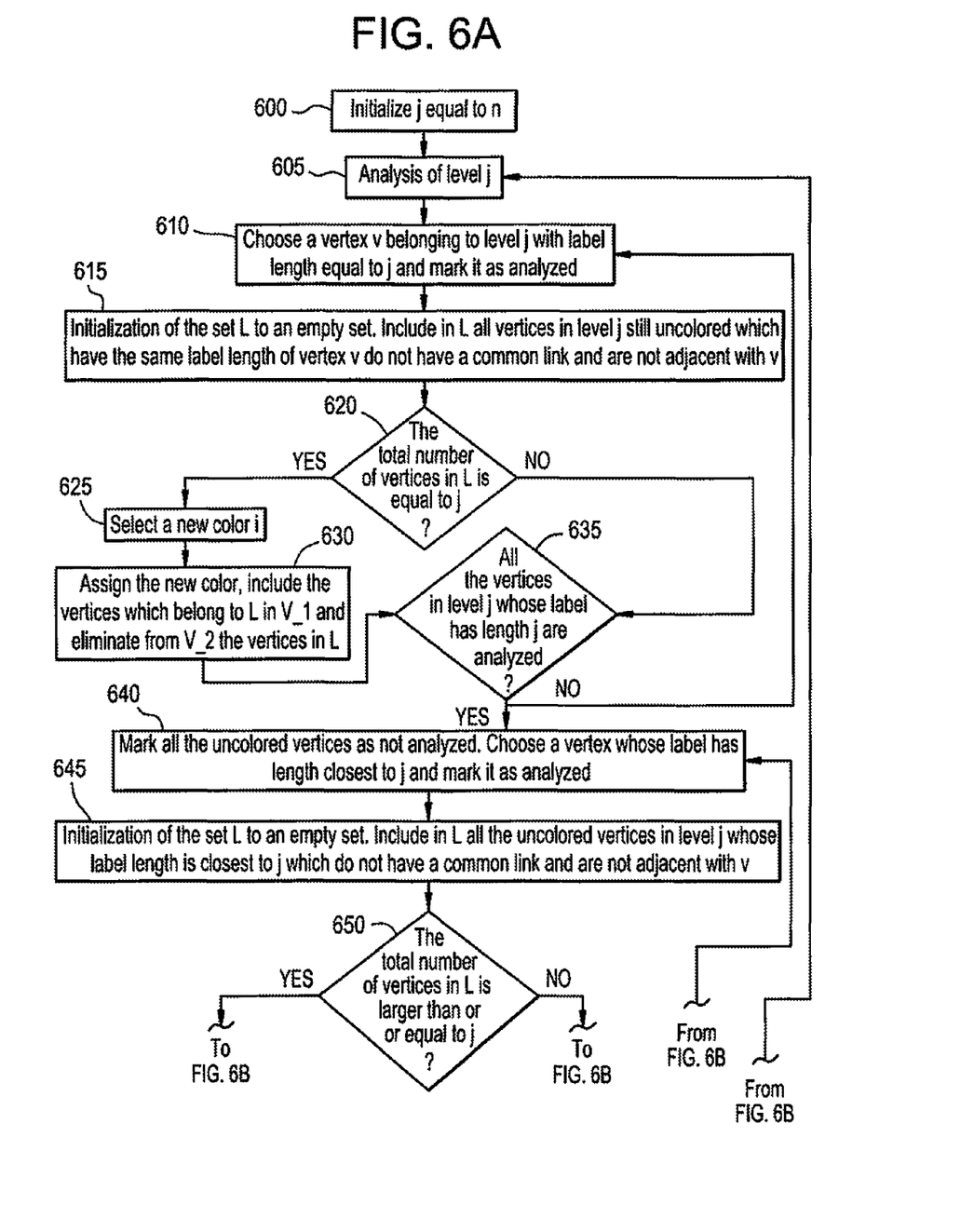
FIGS. 6A and B illustrate example operations for coloring a conflict graph according to at least one example embodiment.
Figure 6B:
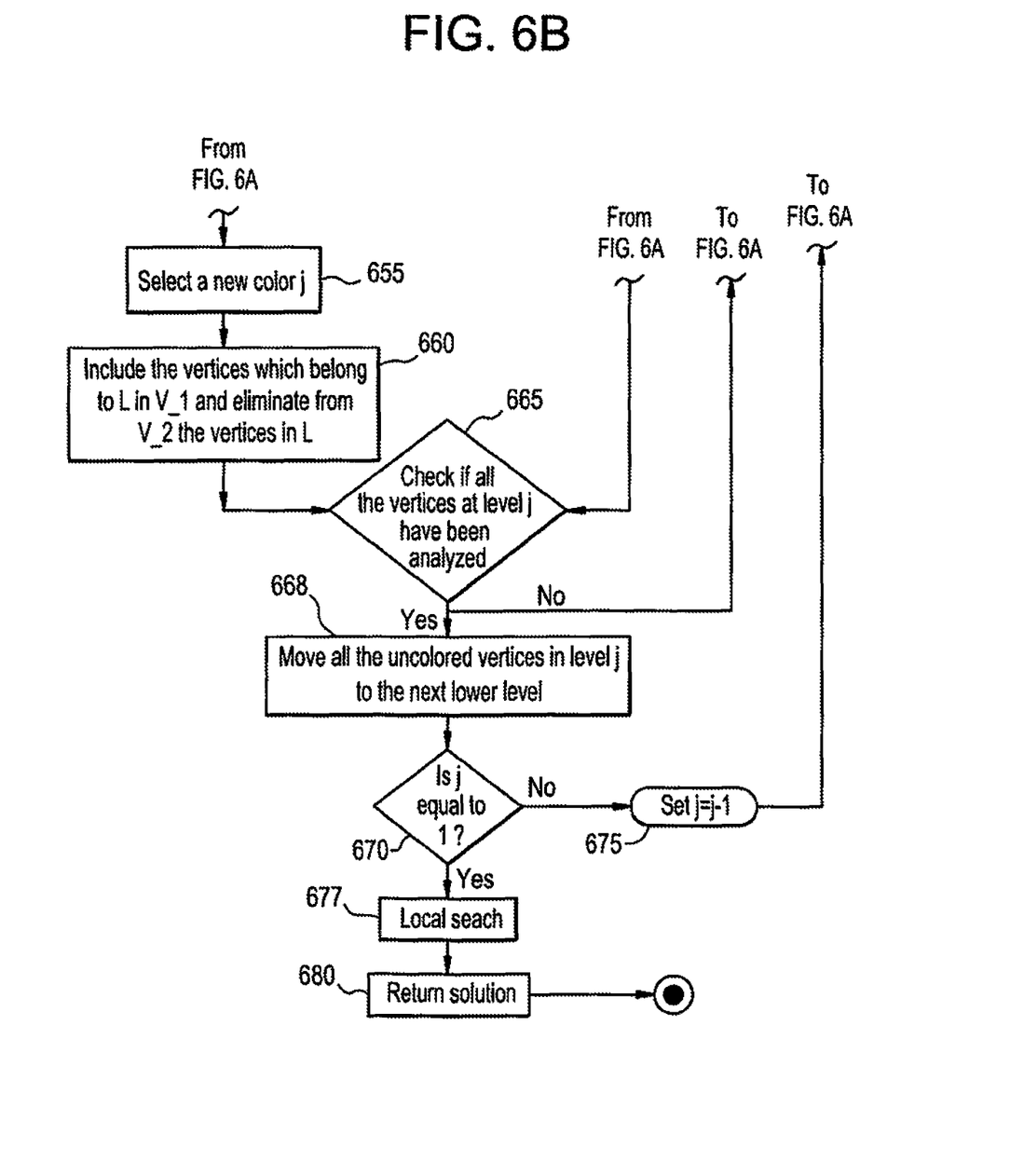

FIGS. 6A and 6B illustrate example operations for coloring a conflict graph according to at least one example. The operations of FIGS. 6A and 6B relate to the algorithms discussed below.

---

Algorithm 1 HgLC$_1$

1:   C = ∅;
2:   c = 0;
3:   choose a ∈ [0, 1]
4:   choose b ∈ [0, 1]
5:   for all i = n, n − 1, ... , 2, 1 do
6:       for all v ∈ G$_i$ and |K$_v$| = i do
7:           I = {v};
8:           for all v' ∈ G$_i$ \ I with |K$_{v'}$| = |K$_v$| do
9:               if {There is no edge between v' and I} then

| | Algorithm 1 HgLC$_1$ |
|---|---|
| 10: | I = I ∪ v'; |
| 11: | end if |
| 12: | end for |
| 13: | if |I| = i then |
| 14: | Color all the vertices in I by c ∉ C; |
| 15: | c[I] = c, C = C ∪ c; |
| 16: | G$_i$ = G$_i$ \ I; |
| 17: | end if |
| 18: | end for |
| 19: | for all Randomly pick a v ∈ W$_1$ ⊂ G$_i$, with |
| | W$_1$ = {v ∈ G$_i$ : min$_{v∈Gi}$ |K$_v$| ≤ |K$_v$| ≤ min$_{v∈Gi}$ |K$_v$| + ⌊a (max$_{v∈Gi}$ |K$_v$| − min$_{v∈Gi}$ |K$_v$|)⌋} do |
| 20: | I = {v}; |
| 21: | Q$_i$ = G$_i$ \ I; |
| 22: | for all Randomly pick a v' ∈ W$_2$ ⊂ Q$_i$, with |
| | W$_2$ = {v' ∈ Q$_i$ : min$_{v∈Qi}$ |K$_{v'}$| ≤ |K$_v$| ≤ min$_{v∈Qi}$ |K$_{v'}$| + ⌊b ·(max$_{v∈Qi}$ |K$_{v'}$| − min$_{v∈Qi}$ |K$_{v'}$|)⌋} do |
| 23: | if {There is no edge between v' and I} then |
| 24: | I = I ∪ v'; |
| 25: | Q$_i$ = Q$_i$ \ {v'}; |
| 26: | else |
| 27: | Q$_i$ = Q$_i$ \ {v'}; |
| 28: | end if |
| 29: | end for |
| 30: | if |I| ≥ i then |
| 31: | Color all the vertices in I by c ∉ C; |
| 32: | c[I] = c, C = C ∪ c; |
| 33: | G$_i$ = G$_i$ \ I; |
| 34: | else |
| 35: | G$_i$ = G$_i$ \ {v}, G$_{i−1}$ = G$_{i−1}$ ∪ {v}; |
| 36: | end if |
| 37: | end for |
| 38: | end for |
| 39: | c =LocalSearch(Hc,w, c, C); |

In the above algorithm (referred to as "HgC Algorithm"), let f(v) be the packet represented by vertex v in the conflict graph. Define U as the set of user destination devices, K$_v$={∀u∈U: f(v)∈Q$_u$∪C$_u$}, where Q$_u$ is the set of all the packets requested by user destination device u and C$_u$ is the set of all the cached packets by user destination device u. We refer to K$_v$, as the label associated to vertex "v". For example, if vertex v$_1$ representing packet A$_1$ (f(v$_1$)=A$_1$) is requested by user destination device 1 and user destination device 2, and cached in user destination device 3 and user destination device 4, then K$_{v_1}$={1, 2; 3, 4}.

Let G$_i$={v:|K$_v$|=i}. We consider G$_i$ as the original hierarchies (or levels). We start from hierarchy (or level) n, which is the highest hierarchy or level. First, we color a subset of vertices in G$_n$ with the same color if: they have the same |K$_v$|=n, and the cardinality of such set is equal to n and there are no links between any two vertices of such set in the conflict graph (i.e., searching for the independent set with a size "n" in a greedy manner). (Note that two nodes having the same |K$_v$| and not being connected by a link in the conflict graph is equivalent to stating that they have the same K$_v$). Then we merge the rest of the uncolored vertices in G$_n$ with G$_{n−1}$ (i.e., G$_{n−1}$≡G$_{n−1}$∪G$_n$, line 35 of the HgC Algorithm) to result in a new hierarchy (or level) n−1.

In the hierarchy (or level) n−1, for all K$_v$ such that |K$_v$|=n−1, we first color a subset of vertices in G$_{n−1}$ with the same colors if: they have the same |K$_v$|=n−1, the cardinality of such set is equal to n and there are no links between any two vertices of such set. Then we try to color the rest of the vertices in G$_{n−1}$.

The criteria we use to color the rest of the vertices in G$_{n−1}$ are: we first randomly select a vertex v from W$_1$∈G$_{n−1}$ shown in line 19 of the HgC Algorithm, where W$_1$ denotes a set of vertices with "small" |K$_v$|, v∈G$_{n−1}$ or "large degree" in H$_{C,Q}$, and where the value a∈[0,1] controls the size of W$_1$. For example, if a=0, then W$_1$ denotes the vertex with the smallest |K$_v$|, v∈G$_{n−1}$.

Second, we try to color with the same color the selected vertex v and the vertices v'∈W$_2$⊆G$_i$\{v} where W$_2$ is defined as the set of uncolored vertices in the "i" level whose |K$_{v'}$|, with v'∈G$_i$\{v} are "close" to |K$_v$| in a greedy manner. Similar to the parameter a∈[0,1], this closeness is captured by another parameter b∈[0,1] as shown in line 22 in the algorithm. For example, if b=0, then we start from the vertex v' such that |K$_{v'}$|−|K$_v$| is minimized. Here, we are looking for the independent set with a size of at least "i" in the i-th hierarchy (or level) in a greedy manner.

After this second coloring procedure, we union the uncolored vertices with the vertices of next hierarchy (or level), which, in this case, is G$_{n−2}$. Then, we repeat the same procedure for all the hierarchies (or levels).

Finally, we use a function called LocalSearch to further reduce the number of colors used for the final conflict graph in line 39 of the HgC Algorithm. The details of the LocalSearch are given by the algorithm below.

| | Algorithm 2 LocalSearch(Hc,w, c, C) |
|---|---|
| 1: | for all c ∈ C do |
| 2: | Let J$_c$ be the set of vertices whose color is c; |
| 3: | Let B = ∅; |
| 4: | Let ĉ = c; |
| 5: | for all i ∈ J do |
| 6: | A = ∅; |
| 7: | for all j ∈ N (j) do |
| 8: | A = A ∪ c[j]; |
| 9: | if C \ A ≠ ∅ then |
| 10: | c' is randomly picked from C \ A; |
| 11: | ĉ[i] = c'; |
| 12: | B = B ∪ {i}; |
| 13: | end if |
| 14: | end for |
| 15: | if |B| = |J$_c$| then |
| 16: | c = ĉ; |
| 17: | C = C \ c; |
| 18: | end if |
| 19: | end for |
| 20: | end for |
| 21: | return c; |

Here, let. N(j) denote the neighboring vertices of vertex "j" (excluding vertex "j"). For clarity, we use a comma to separate the user destination device requesting A$_1$ and the user destination devices caching A$_1$. Furthermore, c is the desired vector showing the coloring. The complexity of the HgC algorithm is O(n$^3$B$^2$).

It should be understood that the operations illustrated in FIGS. 6A and 6B relate to the HgC Algorithm for a=0 and b=0 and correspond to operations performed as part of operation 445 in FIG. 4. Initially, the network element 151 defines 'V' as the vertices in the conflict graph, V_1 as a set of colored vertices, and V_2 as a set of uncolored vertices. Before the coloring operations begin, set V_1 is empty and V_2=V.

In operation 600, the network element 151 initializes level j=n, where n denotes a highest level from among the assigned levels (recall that the vertices were ordered based on their assigned levels in operation 430). In operation 605, the network element 151 selects level 'j' for analysis.

In operation 610, the network element 151 selects a vertex 'v' belonging to level j with a label length equal to j and marks that vertex as being analyzed. In operation 615, the network element 151 forms a set 'L' of the vertices. The network element 151 forms the set L with the vertices in level j that i) have the same label length as vertex v (i.e., have the same |$K_v$|), ii) are uncolored, iii) are not linked to each other, and iv) are not linked to vertex v. In operation 620, the network element 151 determines if the number of vertices in set L (which includes vertex v) is equal to the number of level j. If not, then the network element 151 does not assign a color to the vertices in set L and proceeds to operation 635 to check if all vertices in level j have been analyzed. If the number of vertices in set L is equal to j, then the network element 151 selects a new color in operation 625 (e.g., a color not yet used in the conflict graph). In operation 630, the network element 151 assigns the new color to vertices in set L, includes the vertices in set L in set V_1, and eliminates the vertices in set L from set V_2.

Then, in operation 635, the network element 151 determines whether all of the vertices in level j that have a label length of j have been analyzed. If not, then the network element 151 returns to operation 605. If so, then the network element 151 proceeds to operation 640.

In operation 640, the network element 151 determines which vertices in level j have not been colored, marks these uncolored vertices as not analyzed, selects a vertex 'w' whose label has length greater than or equal to level j, and marks vertex 'w' as analyzed. This is equivalent to the description above regarding coloring the rest of the vertices in $G_{n-1}$ when a=0.

In operation 645, the network element 151 resets set L to an empty set and forms set L to include the still uncolored vertices in level j having a label with a length closest (or larger than or equal to) to j that are not linked to each other and are not linked to vertex "w". In operation, 650, the network element 151 determines whether the number of vertices in set L (which includes vertex "w") is greater than or equal to "j". If not, then the network element 151 does not color any vertices and proceeds to operation 665 to determine if all vertices at level j have been analyzed.

If, in operation 650, the network element 151 determines that the total number of vertices in set L is greater than or equal to j, then the network element 151 selects a new color in operation 655 (e.g., a color not yet used in the conflict graph). In operation 660, the network element 151 assigns the new color to vertices in set L, includes the vertices in set L in set V_1, and eliminates the vertices in set L from set V_2. In operation 665, the network element 151 determines whether all the vertices at level j have been analyzed. If not, then the network element 151 returns to operation 640. If so, then, in operation 668, the network element 151 moves all the uncolored vertices in level j to the next lower level to create a new level j–1 which is given by the union of all vertices originally belonging to level j–1 with the uncolored vertices belonging to level j. Next, in operation 670, the network element 151 determines if level j is equal to one (or the lowest assigned level from among the assigned levels).

If level j is equal to one (or the lowest assigned level from among the assigned levels), then the network element 151 proceeds to operation 677. Otherwise, in operation 675, the network element 151 sets level j to j–1 and returns to operation 605. In operation 675, it should be understood that the network element 151 places any uncolored vertices remaining in level j into a next lowest level (i.e., j–1) in order to ensure that all vertices of the conflict graph are assigned a color. In operation 677, the network element performs a local search in an attempt to reduce the total number of colors used in the conflict graph. For example, the network element 151 selects a color from existing colors of the conflict graph, identifies vertices with the selected color, and replaces the selected color with a different color chosen from the existing colors if vertices linked to the identified vertices are not colored with the different color. Thus, the selected color is eliminated from the set of existing colors. Then, the network element 151 returns a colored conflict graph as the solution in 680.

In view of the operations shown in FIGS. 6A and 6B, it should also be understood that operations of FIGS. 6A and 6B may correspond to the network element 151 selecting an uncolored vertex having the highest level, and assigning a same color to the selected vertex and to a subset of uncolored vertices in the plurality of vertices if (i) the vertices in the subset have an assigned label with a desired length, the desired length being based on input parameters and on the length of the label of the selected vertex, (ii) the vertices in the subset do not have a link to the selected vertex, (iii) the vertices in the subset do not have link between each other, and (iv) a cardinality of the subset is equal to the value of the level minus one. It should be further understood that operations of FIGS. 6A and 6B correspond to the network element 151 performing the selecting and the assigning a same color operations iteratively until all vertices of the highest level have been selected, and updating vertices of the highest level that are still uncolored to a next level below the highest level. Still further, it should be understood that operations of FIGS. 6A and 6B are performed by network element 151 until all of the vertices of the conflict graph are colored. Still further, it should be understood that the levels may also be referred to as hierarchies and the set of vertices assigned to level (or hierarchy) "j" is denoted with $G_j$ so the operation of placing all the uncolored vertices remaining in level j into level j–1 is equivalent to forming the set $G_{j-1}$. It should be understood that this operation of forming $G_{j-1}$ is equivalent to operation 668.

Figure 7:
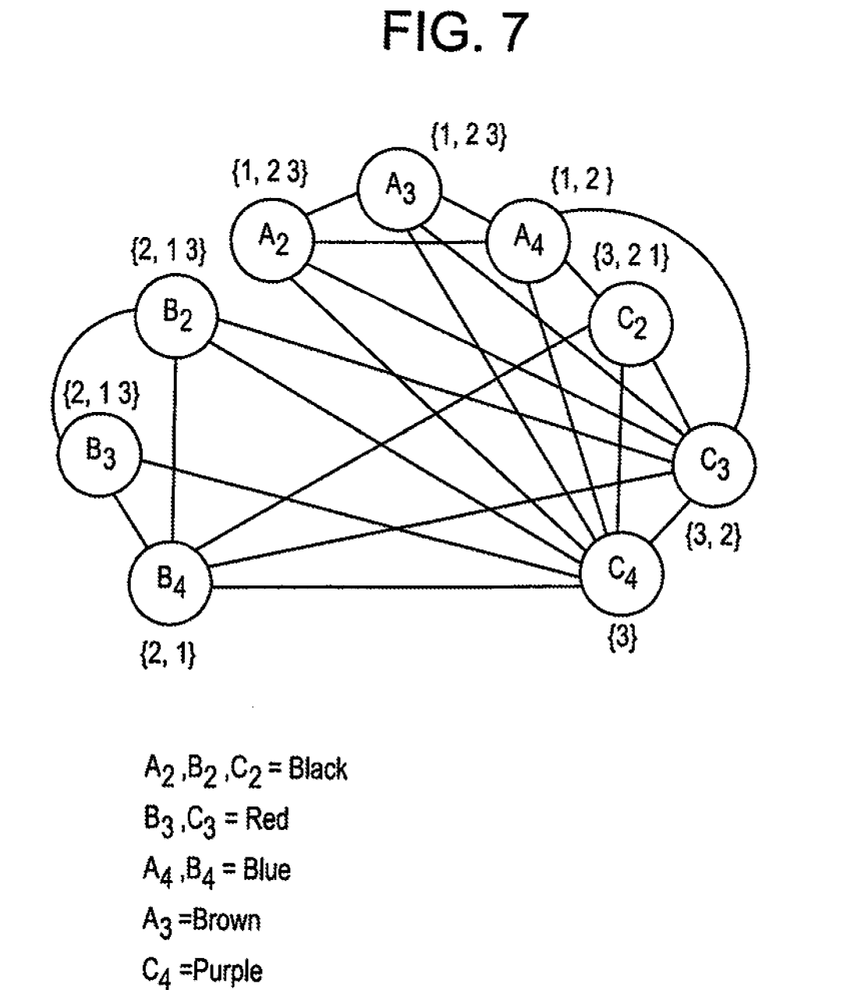
FIG. 7 illustrates a colored conflict graph according to at least one example embodiment.

FIG. 7 illustrates a colored conflict graph according to at least one example embodiment. For example, FIG. 7 illustrates a conflict graph constructed according to FIG. 5 and colored according to the HgC scheme and the operations of FIGS. 6A and 6B.

In FIG. 7, we consider a shared link network with n=3 destination devices (or user devices) 200 (i.e., U={1, 2, 3}), and m=3 data files A, B, C (i.e., F={A, B, C}. Each data file is divided into four packets. For example, data file A has four packets of {$A_1$, $A_2$, $A_3$, $A_4$}. For the caching phase (i.e., see FIGS. 3A and 3B and related description), let user device 1 cache {$A_1$, $B_1$, $B_2$, $B_3$, $B_4$, $C_2$}, user device 2 cache {$A_1$, $A_2$, $A_3$, $A_4$, $B_1$, $C_2$, $C_3$}, and user device 3 cache {$A_1$, $A_2$, $A_3$, $B_1$, $B_2$, $B_3$}. Then, let user devices {1, 2, 3} request data files {A, B, C} respectively. Equivalently, user device 1 requests A2, A3, A4; user device 2 requests B2, B3, B4; and user device 3 requests C1, C2, C3, C4. Then, we have $K_{A2}$={1, 2 3} (the comma is used to separate the user device requesting packet A2 from the user devices that have cached packet A2. Here, packet A2 is requested by user device 1, while packet A2 is cached by user devices 2 and 3); $K_{A3}$={1; 2, 3}; $K_{A4}$={1; 2}; $K_{B2}$={2; 1, 3}; $K_{B2}$={2; 1, 3}; $K_{B4}$={2; 1}; $K_{C2}$={3; 1, 2}; $K_{C3}$={3; 2}; $K_{C4}$={3} (here C4 is requested by user device 3 and not cached anywhere).

The HgC scheme works as follows (with reference to the HgC algorithm and FIGS. 6A and 6B). For j=n=3, G3={A2, A3, B2, B3, C2}, let vertex v=A2, then it can be found that B2 and C2 would be in set L, hence set L={A2, B2, C2}. Now since |L|=n=3, we color A2, B2, C2 with black. Then 3=G3\L={A3, B3}. In the following loop, since we cannot find a set I with |L|=n=3, we move to line 21 of the algorithm. Then since we cannot find set L with |L|≥n=3, then we do G2=G2∪{A3}, and then G2=G2∪{B3}. Therefore, we obtain G2={A3, A4, B3, B4, C3}. Now we go to line 3 of the algorithm (i.e., start next loop), For j=j−1=n−1=2, in this loop, we first pick vertex v=A4, then we find L={A4, B4}. We color {A4, B4} with blue (see FIG. 4). Now G2=G2\{A4, B4}={A3, B3, C3}. Then in line 21 of the algorithm, we find the vertex with smallest length of Kv, which is C3 with $K_{C3}$=(3; 2), then we find L=(C3, B3). We color L={C3, B3} with red. Now G2=G2\{C3, B3}={A3}. Since there is no L≥2, then we do G1=G1∪{A3}={C4, A3}. Then we go to next loop j=j−1=n−2=1. Then, we can see that L={C4}, and we color {C4} with purple. Then G1=G1\{C4}={A3}. Hence, we can find L={A3} and we color {A3} with brown. The fully colored conflict graph is shown in FIG. 7.

It should be understood that the operations described above allow for improved performance of the network because example embodiments allow for the ability to cache more packets of the more popular files at destination devices 200, to increase (or alternatively, maximize) the amount of distinct packets of each file collectively cached by the destination devices 200, and to allow coded multicast transmissions within a full set of requested packets of the data files. By combining packets prior to transmission it should be understood that delivery methods and/or devices according to at least one example embodiment may reduce the number of transmissions of the network element 151 which may reduce consumption and improve network efficiency. For example, in some scenarios of interest, the above described methods and devices may reduce the number of transmissions up to a factor of 10. If we have unlimited complexity, the gain can be unbounded. Further, it should be appreciated that a memory (or cache) size of each user destination may be used as a bandwidth multiplier.

Variations of the example embodiments are not to be regarded as a departure from the spirit and scope of the example embodiments. All such variations as would be apparent to one skilled in the art are intended to be included within the scope of this disclosure.

What is claimed is:

1. A method for transmitting data files in a network, comprising:
   receiving requests from destination devices for packets of the data files;
   constructing a conflict graph such that each packet requested by each destination device is represented by a distinct vertex in a plurality of vertices of the conflict graph, the plurality of vertices being associated with the destination devices;
   assigning labels to the plurality of vertices, each label being a set of indices denoting the destination devices requesting a packet and the destination device caches storing the packet;
   assigning levels to the plurality of vertices, each level indicating a number of the destination devices requesting the packet and a number of destination device caches storing the packet;
   ordering the plurality of vertices from vertices having a highest level to vertices having a lowest level;
   coloring the plurality of vertices based on the ordering;
   combining the packets represented by vertices in the plurality of vertices having a same color; and
   sending the combined packets.

2. The method of claim 1, wherein each level is a sum of the number of destination devices requesting a packet and the number of destination device caches storing the requested packet.

3. The method of claim 1, wherein the combining performs linear combination operations over a finite field on the packets represented by the vertices having the same color.

4. The method of claim 1, wherein the constructing includes creating a link between a first and a second of the plurality of vertices if (i) the first and second vertices do not represent a same packet, and (ii) a packet represented by the first vertex is not stored in the cache of the destination device associated with the second vertex, or the packet represented by the second vertex is not stored in the cache of the destination device associated with the first vertex.

5. The method of claim 4, wherein the coloring includes,
   selecting an uncolored vertex having a label length equal to the highest level, and
   assigning a same color to the selected vertex and to a subset of uncolored vertices in the plurality of vertices if (i) the vertices in the subset have a desired label length, the desired label length being based on input parameters and on the level of the selected vertex, (ii) the vertices in the subset do not have a link to the selected vertex, (iii) the vertices in the subset do not have link between each other, and (iv) a cardinality of the subset is equal to the value of the level minus one.

6. The method of claim 5, wherein the coloring includes,
   performing the selecting and the assigning a same color operations iteratively until all vertices of the highest level have been selected,
   performing an additional coloring operation on vertices in the highest level that are uncolored if a number of the uncolored vertices is greater than or equal the highest level, and
   updating levels of vertices of the highest level that are still uncolored after the additional coloring operation to a next level below the highest level.

7. The method of claim 6, wherein the coloring is performed until the plurality of vertices of the conflict graph are colored.

8. The method of claim 7, further comprising:
   performing a local search on the plurality of colored vertices to reduce the number of colors used for the conflict graph.

9. The method of claim 8, wherein the performing a local search includes,
   selecting a color from existing colors of the conflict graph,
   identifying vertices with the selected color,
   replacing the selected color with a different color chosen from the existing colors if the vertices linked to the identified vertices are not colored with the different color.

10. A network element, comprising:
    a memory having computer-readable instructions stored therein; and
    a processor configured to execute the computer-readable instructions to,
       receive requests from destination devices for packets of the data files;
       construct a conflict graph such that each packet requested by each destination device is represented by a distinct vertex in a plurality of vertices of the conflict graph, the plurality of vertices being associated with the destination devices;
       assign labels to the plurality of vertices, each label being a set of indices denoting the destination devices requesting a packet and the destination device caches storing the packet;
       assign levels to the plurality of vertices, each level indicating a number of the destination devices requesting the packet and a number of destination device caches storing the packet;
order the plurality of vertices from vertices having a highest level to vertices having a lowest level;
color the plurality of vertices based on the ordering;
combine the packets represented by vertices in the plurality of vertices having a same color; and
send the combined packets.

11. The network element of claim 10, wherein each level is a sum of the number of destination devices requesting a packet and the number of destination device caches storing the requested packet.

12. The network element of claim 10, wherein the processor is configured to execute the computer-readable instructions to combine the packets by performing linear combination operations over a finite field on the packets represented by the vertices having the same color.

13. The network element of claim 10, wherein the processor is configured to execute the computer-readable instructions to construct the conflict graph by creating a link between a first and a second of the plurality of vertices if (i) the first and second vertices do not represent a same packet, and (ii) a packet represented by the first vertex is not stored in the cache of the destination device associated with the second vertex, or the packet represented by the second vertex is not stored in the cache of the destination device associated with the first vertex.

14. The network element of claim 13, wherein the processor is configured to execute the computer-readable instructions to color the plurality of vertices by,
selecting an uncolored vertex having a label length equal to the highest level, and
assigning a same color to the selected vertex and to a subset of uncolored vertices in the plurality of vertices if (i) the vertices in the subset have a desired label length, the desired label length being based on input parameters and on the level of the selected vertex, (ii) the vertices in the subset do not have a link to the selected vertex, (iii) the vertices in the subset do not have link between each other, and (iv) a cardinality of the subset is equal to the value of the level minus one.

15. The network element of claim 14, wherein the processor is configured to execute the computer-readable instructions to,
perform the selecting and the assigning a same color operations iteratively until all vertices of the highest level have been selected, and
update levels of vertices of the highest level that are still uncolored to a next level below the highest level.

16. The network element of claim 15, wherein the processor is configured to execute the computer-readable instructions to update the levels until a lowest level is reached to indicate that the plurality of vertices are colored.

17. The network element of claim 16, wherein the processor is configured to execute the computer-readable instructions to perform a local search on the plurality of colored vertices to reduce the number of colors used for the conflict graph.

18. The network element of claim 17, wherein the processor is configured to execute the computer-readable instructions to perform the local search by,
selecting a color from existing colors of the conflict graph,
identifying vertices with the selected color, and
replacing the selected color with a different color chosen from the existing colors if vertices linked to the identified vertices are not colored with the different color.

* * * * *